US007836267B1

(12) United States Patent
Cross

(10) Patent No.: US 7,836,267 B1
(45) Date of Patent: Nov. 16, 2010

(54) OPEN COMPUTER FILES SNAPSHOT

(75) Inventor: Kenneth J. Cross, Knoxville, TN (US)

(73) Assignee: Barracuda Networks Inc, Campbell, CA (US)

( * ) Notice: Subject to any disclaimer, the term of this patent is extended or adjusted under 35 U.S.C. 154(b) by 474 days.

(21) Appl. No.: 11/847,380

(22) Filed: Aug. 30, 2007

Related U.S. Application Data

(60) Provisional application No. 60/840,934, filed on Aug. 30, 2006.

(51) Int. Cl.
*G06F 12/00* (2006.01)
*G06F 13/00* (2006.01)

(52) U.S. Cl. .............. 711/162; 711/100; 711/154; 711/169; 707/609

(58) Field of Classification Search ........ 711/161, 711/100, 101, 102, 103, 154, 162, 163, 169; 707/609, 639, 640
See application file for complete search history.

(56) References Cited

U.S. PATENT DOCUMENTS

| 5,649,152 | A  | * | 7/1997  | Ohran et al. ............. 711/114 |
| 6,078,932 | A  | * | 6/2000  | Haye et al. ................ 1/1 |
| 6,460,055 | B1 | * | 10/2002 | Midgley et al. ............. 1/1 |
| 6,983,352 | B2 | * | 1/2006  | Keohane et al. ........... 711/162 |
| 7,007,044 | B1 | * | 2/2006  | Rafert et al. ............... 1/1 |
| 7,069,402 | B2 | * | 6/2006  | Coulter et al. ............ 711/162 |
| 7,373,364 | B1 | * | 5/2008  | Chapman .................. 1/1 |
| 7,421,714 | B1 | * | 9/2008  | Orling et al. ............. 719/328 |
| 2002/0120791 | A1 | * | 8/2002  | Somalwar et al. ......... 709/330 |
| 2002/0156826 | A1 | * | 10/2002 | Bantz et al. ............... 709/201 |
| 2003/0093443 | A1 | * | 5/2003  | Huxoll .................... 707/204 |
| 2003/0093444 | A1 | * | 5/2003  | Huxoll .................... 707/204 |

OTHER PUBLICATIONS

"DBMS Protocol for Safe File Extension in a Multisystem Shared Disk Environment"; IBM Technical Disclosure Bulletin NNRD-444198; IBM; Apr. 1, 2001.*
"Pause and Continue Internal Database Functions"; IBM Technical Disclosure Bulletin NN-8904463; IBM; Apr. 1, 1989.*
Ethernet Packet size; Jan. 24, 1999.*
An Empirical Study of Delta Algorithms; Hunt et al.; ISCE '96 Proceedings of the SCM-6 Workshop on System Configuration Management, Mar. 25, 1996-Mar. 26, 1996 (retrieved from SpringerLink, Lecture Notes in Computer Science, vol. 1167/1996, pp. 49-66).*

(Continued)

*Primary Examiner*—Tuan V. Thai
(74) *Attorney, Agent, or Firm*—Patentry

(57) ABSTRACT

A method for backing up a computer-readable data file with a computerized backup application, where the data file is open and locked for exclusive access by an owning application that is mutually independent of the backup application. The backup application by-passes the lock on the data file. Any write operations to the data file by the owning application are intercepted and delayed. The address range of any write operations directed to the data file by the owning application during the backup procedure are written to a change log file, where the change log file contains no indication of the content of the write operations. At least a portion of the data file is copied to a backup file, and any intercepted and delayed write operations are passed on to the data file after the data to be overwritten has been copied to the backup file.

20 Claims, 3 Drawing Sheets

OTHER PUBLICATIONS

Inside Windows Storage: Server Storage Technologies for Windows(R) 2000, Windows(R) Server 2003, and Beyond; Dilip C. Naik; Addison-Wesley Professional Jul. 15, 2003; chapter 5, Backup and Restore Technologies.*

How Volume Shadow Copy Service Works; Microsoft TechNet; Mar. 28, 2003.*

Definiton of "defer"; Merriam-Webster OnLine.*

* cited by examiner

OPEN COMPUTER FILES SNAPSHOT

This application claims the priority date and all other benefits of prior provisional application 60/840,934 filed 2006 Aug. 30.

FIELD

This invention relates to the field of computerized data recording systems. More particularly, this invention relates to creating backups of open files.

BACKGROUND

Information in a computer system is stored in data files. To ensure that this information isn't lost, these data files are typically backed-up to an independent data store, from which the information can be retrieved if the original data file is lost or corrupted. However, traditional backup systems do not back up a data file that is open and locked by another application at the time that the backup application is ready to process the given data file. Files such as this include certain e-mail and database files. These files are kept open for exclusive access by the "owning" application(s), because the owning application makes frequent changes to such data files, and the locked status prevents other applications from modifying the file content.

This system, although beneficial in many respects, nevertheless presents several problems for a backup application. First, because the files are locked for exclusive access, standard backup applications cannot access the data within the file to make a backup copy. Second, because the files change frequently and are generally too large to copy in a single read operation, portions of the file might change during the time it takes to make a copy using multiple read operations. This can result in an inconsistent, and useless, copy of the file. Third, many of these applications make use of transactions, or in other words, multiple changes to the file that are executed in a single process. Making a copy of a file at an arbitrary point in time that occurs in the middle of such a transaction would produce an inconsistent, and useless, copy of the file.

There are currently three approaches for backing up open files. The first approach is to have application-dependent backup programs. These programs generally request that the application temporarily stop writing to the file and release the exclusive access lock on it, so that the file can be copied by the backup program. However, these programs only work with a specific application or set of applications for which they were designed.

The second approach is to have a file system process that intercepts all data written to an open file and creates a journal file containing a chronological log of all data changes. Alternately, the application itself, such as a database server, may create a journal file separate from the data file as part of its normal operation. A backup application periodically (or upon change) reads the journal file and applies the changes to a separate backup copy of the open file. This requires the application or a file system process to perform an additional write operation for each data change, which might impact the performance of the application. Also, an initial baseline copy of the file is required, which must be created while the file is closed.

The third approach is to perform periodic volume snapshots. A volume snapshot captures the entire contents of a volume, such as all files and directories stored on the volume, and includes any changes since the last snapshot. The snapshot, which is static, can then be copied to create a backup of the entire volume. However, the volume snapshot is not synchronized with the write patterns of any particular application and can happen in the middle of a transaction.

What is needed, therefore, is a system that overcomes problems such as those described above, at least in part.

SUMMARY

The above and other needs are met by a method for backing up a computer-readable data file with a computerized backup application, where the data file is open and locked for exclusive access by an owning application that is mutually independent of the backup application. The backup application by-passes the lock on the data file. Any write operations to the data file by the owning application are intercepted and delayed. The address range of any write operations directed to the data file by the owning application during the backup procedure are written to a change log file, where the change log file contains no indication of the content of the write operations. At least a portion of the data file is copied to a backup file, and any intercepted and delayed write operations are passed on to the data file after the data to be overwritten has been copied to the backup file.

In this manner, embodiments of the present invention provide a backup application that works with any owning application and associated data file. Further, these embodiments backup the data file while it is in a consistent state, rather than in a state where a transaction set of changes has only been partially applied. In addition, all of the pending changes to the data file do not need to be written to the change log file. Instead, only the address range of the write operations directed to the data file are recorded in the change log file.

In various embodiments, the backup application creates a baseline copy of the data file by copying all contents of the data file to the backup file. In some embodiments, the backup application creates a snapshot copy of the data file by determining that the data file is quiescent, and copying to the backup file only those contents of the data file that have changed since a prior backup copy of the data file was created. In some embodiments one or more of a quiescent time and an automatic snapshot copy creation interval are specified by a user. The data file to backup is user-selectable in some embodiments. In some embodiments the data file is too large to copy in a single read operation.

In some embodiments the intercepting, delaying, and writing steps are performed by a file system filter process that resides at a kernel level. Similarly, in some embodiments the copying steps are performed by a snapshot process that resides at a user level.

Also disclosed is a computer readable medium containing program elements operable to instruct a computer system to backup a computer-readable data file with a computerized backup application, where the data file is open and locked for exclusive access by an owning application that is mutually independent of the backup application.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein.

DETAILED DESCRIPTION

Figure 1:
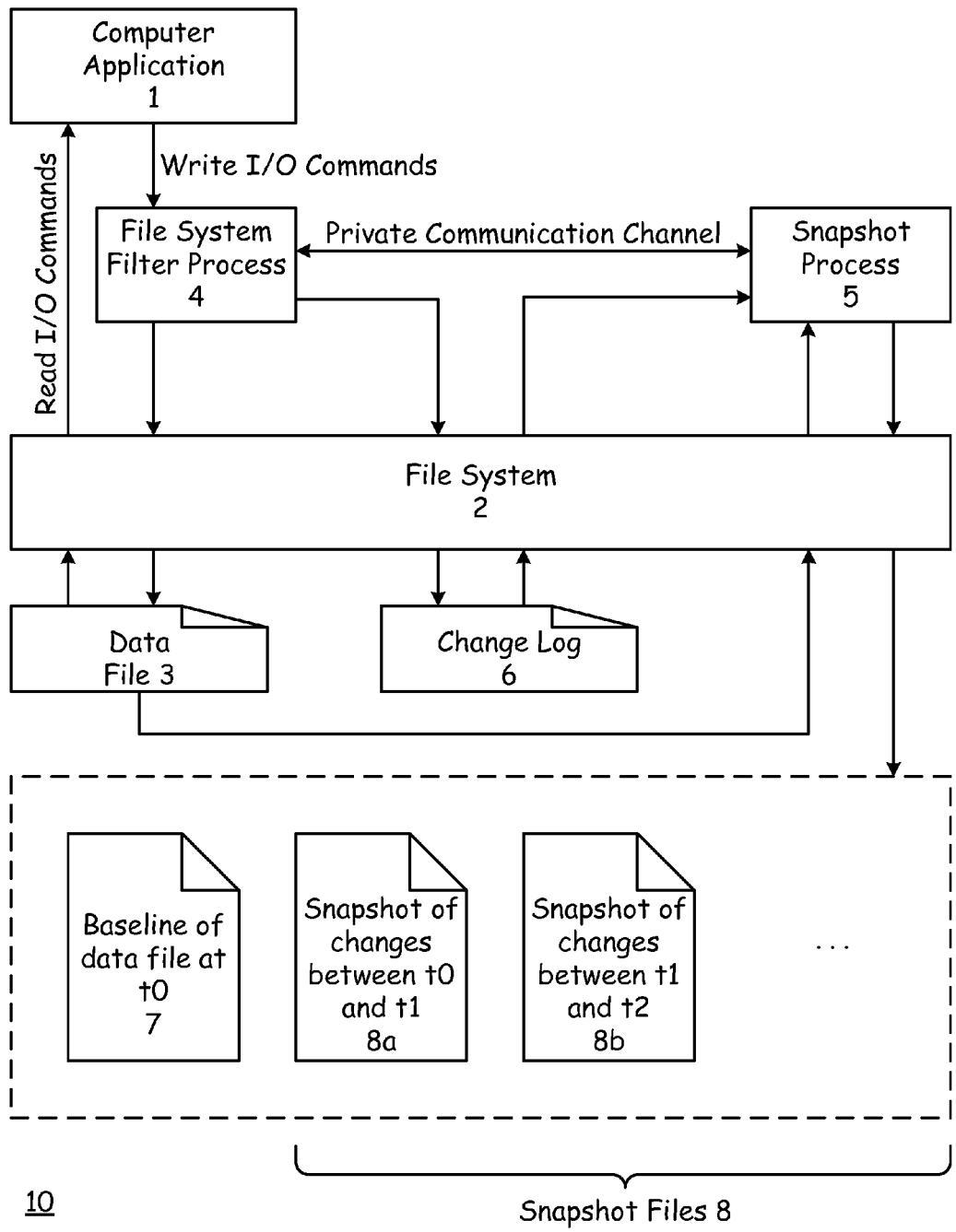
FIG. 1 is a functional block diagram of an embodiment of the present invention.

Certain elements of the embodiments of the invention are first generally presented in the Overview below, and then specific details of the embodiment of the invention are described with more particularity and with reference to the figures in the Additional Discussion below.

OVERVIEW

One embodiment of the invention creates a snapshot—or in other words, an exact point-in-time copy—of specified data files stored on a computer network while computer applications have the data files open for exclusive use. A file system filter process running at kernel level intercepts a subset of file system operations directed toward preselected files, and continuously records changes to the open files. The file system filter process communicates with a snapshot process running at user level that creates (1) an initial baseline copy of the preselected open files, and (2) periodic snapshot files that contain only the changes made to the baseline copy. A baseline file is a special type of snapshot file, and can also be referred to as a snapshot file. A restoration process is used to combine the snapshot files with the baseline file to create an exact copy of the specified file as it existed at a specific point in time. The baseline and snapshot files can be used in conjunction with other processes to provide near-continuous backup of open data files. This overcomes the problems with the current art described above.

When an application first opens a preselected file, a baseline copy of that file is made, if one does not already exist. While the copy is being made, any write operation to the preselected file is temporarily suspended until a copy of the data to be modified is made and the range of the write (offset and number of bytes) is recorded into a change log. The write is then allowed to proceed normally. This results in the baseline copy being an exact copy of the file as it existed at the time the baseline copy started.

Periodically or on demand, a "snapshot" is made of the preselected file while it is open for exclusive access. A snapshot file contains the changes made to the preselected file within a period of time. A series of sequential snapshot files in conjunction with the baseline file represents the exact contents of a preselected file at a specific point in time. When a snapshot is requested, the preselected file is observed for a period of time to ensure that it is quiescent, or in other words, that there is no write activity on the preselected file. This ensures that the preselected file is internally consistent. After determining that the preselected file is quiescent, the exclusive access lock on the preselected file is temporarily bypassed to allow a single, specific process to read the specified file. While the snapshot is being made, any write to the preselected file is temporarily suspended until a copy of the data to be modified is made into a temporary cache and the range of the write is recorded into a change log. The write is then allowed to proceed normally.

The snapshot file is created by first reading the data ranges recorded in the change log (since the last snapshot marker) into a temporary list. These data ranges are sorted in order by their starting offset within the preselected file. Any duplication and overlapping of data ranges are removed during the sort. Then, the sorted data ranges are processed in order. For each data range, the data in the specified file within that range is copied into a snapshot file. If data within the data range being processed has been modified since the snapshot began, the original data within that data range is retrieved from the temporary cache and recorded into the snapshot file. This preserves the contents of the specified file as it existed at the point in time that the snapshot began. The processing proceeds until all of the sorted data ranges have been processed. At this point, the snapshot file contains all the changes to the preselected file since the baseline or the last snapshot. A marker is then placed into the change log indicating when the most recent snapshot occurred.

Any of the preselected files can be restored to the state that existed at the point in time at which any of the baseline or snapshot files were created. To restore a preselected file to a specified point in time, the changes in the snapshot files up to and including the specified point in time are sequentially applied to the baseline copy in chronological order. The resulting file represents an exact copy of the preselected file as it existed as of the time of the last snapshot file that was applied during the restoration.

A user interface is provided for specifying the file or set of files to be handled, the "preselected files," and other parameters, such as the snapshot interval and the quiescent time. A user interface is also provided to allow the selection and restoration of any of the preselected files to the state that existed at a specified point in time.

Embodiments of the invention improve upon the current art of application-dependent backup, because they work with files used by any application and do not require custom processing for each different application. Further, the application is not even aware that a snapshot is taking place.

Embodiments of the invention improve upon the current art of journal file backup because they do not require a second copy of the data to be written to a journal file in real time, because the change log used in such embodiments contains only data ranges within the file and not the data itself. Moreover, they allow a baseline copy of the file to be created even when the preselected file is open for exclusive access.

Embodiments of the invention improve upon the current art of volume snapshot because they take a snapshot of only specific files, and not of the entire volume. Also, volume snapshots can occur while the file is in an inconsistent state, whereas embodiments of the present invention wait until the preselected file becomes quiescent and, therefore, consistent before creating a file snapshot.

ADDITIONAL DISCUSSION

FIG. 1 illustrates a computer application 1 on a computer system that uses a data file 3 stored on a computer network 10. The data file 3 requires that a backup copy be made, even though the computer application 1 has the file 3 opened for exclusive access. The depicted embodiment of the present invention is implemented with the file system filter process 4 and the snapshot process 5 as shown. The computer application 1 sends I/O commands (input and output commands, such as read commands and write commands) through the computer file system 2 to create and modify the data file 3 stored on the computer network 10.

For efficiency and other reasons as generally alluded to above, the computer application 1 keeps the data file 3 open and locked for exclusive access. Typical computer applications that operate in this manner are e-mail clients and database servers. Because the computer application 1 has the data file 3 open for exclusive access, traditional backup applications cannot get access to read the data file 3 to make a backup copy. Other backup approaches also have problems as discussed above.

One embodiment of the present invention is the file system filter process 4, which is interposed between the computer application 1 and the computer file system 2. The file system filter process 4 observes a subset of the I/O commands that the computer application 1 issues to the file system 2 regarding data file 3. When an I/O command to open data file 3 is sent by the computer application 1, the file system filter process 4 instructs a snapshot process 5, running at user level, to create an initial baseline copy 7 of the data file 3. If a baseline 7 of data file 3 has not previously been created, the snapshot process 5 acknowledges the request and begins the baseline copy process.

While the snapshot process 5 is creating the baseline copy 7, the file system filter process 4 continuously monitors any I/O write commands to the data file 3 sent by the computer application 1. The file system filter process 4 notifies the snapshot process 5 of the range of data in the data file 3 to be modified, and waits for the snapshot process 5 to read the data that is about to be modified from the data file 3, and store it in its internal cache. Once the snapshot process 5 notifies the file system filter driver 4 that it has read the data to be modified, the file system filter driver 4 allows the computer application 1's write I/O command to proceed, and records the range of the change into the change log 6.

The snapshot process 5 continues to copy data from the data file 3 to the baseline copy 7 until the entire data file 3 has been copied successfully. When the snapshot process 5 encounters a range of data in the data file 3 that has been modified by the computer application 1, it reads the data from its internal cache rather than directly from the data file 3. The result is that the baseline copy 7 is an exact copy of the data file 3 as it existed at the start of the baseline copy process.

After a baseline copy 7 of the data file 3 has been created, snapshots 8 of the data file 3 are made periodically or on demand. When a snapshot 8 is requested, the snapshot process 5 observes the data file 3 for a period of time to ensure that it is quiescent, as defined above. Once the data file 3 becomes quiescent for the defined period of time, the snapshot process 5 notifies the file system filter process 4 that it is beginning a snapshot of the data file 3. While the snapshot process 5 is creating the snapshot 8, the file system filter process 4 continuously monitors any I/O write commands to the data file 3 sent by the computer application 1. The file system filter process 4 notifies the snapshot process 5 of the range of data in the data file 3 to be modified, and waits for the snapshot process 5 to read the data that is about to be modified from the data file 3, and store it in its internal cache. Once the snapshot process 5 notifies the file system filter driver 4 that it has read the data to be modified, the file system filter driver 4 allows the computer application 1's write I/O command to proceed, and records the range of the change into the change log 6.

The snapshot process 5 reads the data ranges recorded in the change log 6 (since the last snapshot marker) into a temporary list. These data ranges are sorted in order by their starting offset within the data file 3. Any duplication and overlapping of data ranges are removed during the sort. Then, the sorted data ranges are processed in order. For each data range, the data in the data file 3 within that range is copied into a snapshot file 8. If data within the data range being processed has been modified since the snapshot began, the original data within that data range is retrieved from the temporary cache and recorded into the snapshot file 8. This preserves the contents of the specified file 3 as it existed at the point in time that the snapshot process began. The processing proceeds until all of the sorted data ranges have been processed. At this point, the snapshot file 8 contains all the changes to the data file 3 since the baseline 7 or the last snapshot 8 was created. A marker is then placed into the change log 6 indicating when the most recent snapshot occurred.

Other embodiments of the present invention, which are operationally equivalent to the above, are possible.

File System Filter Process

Figure 2:
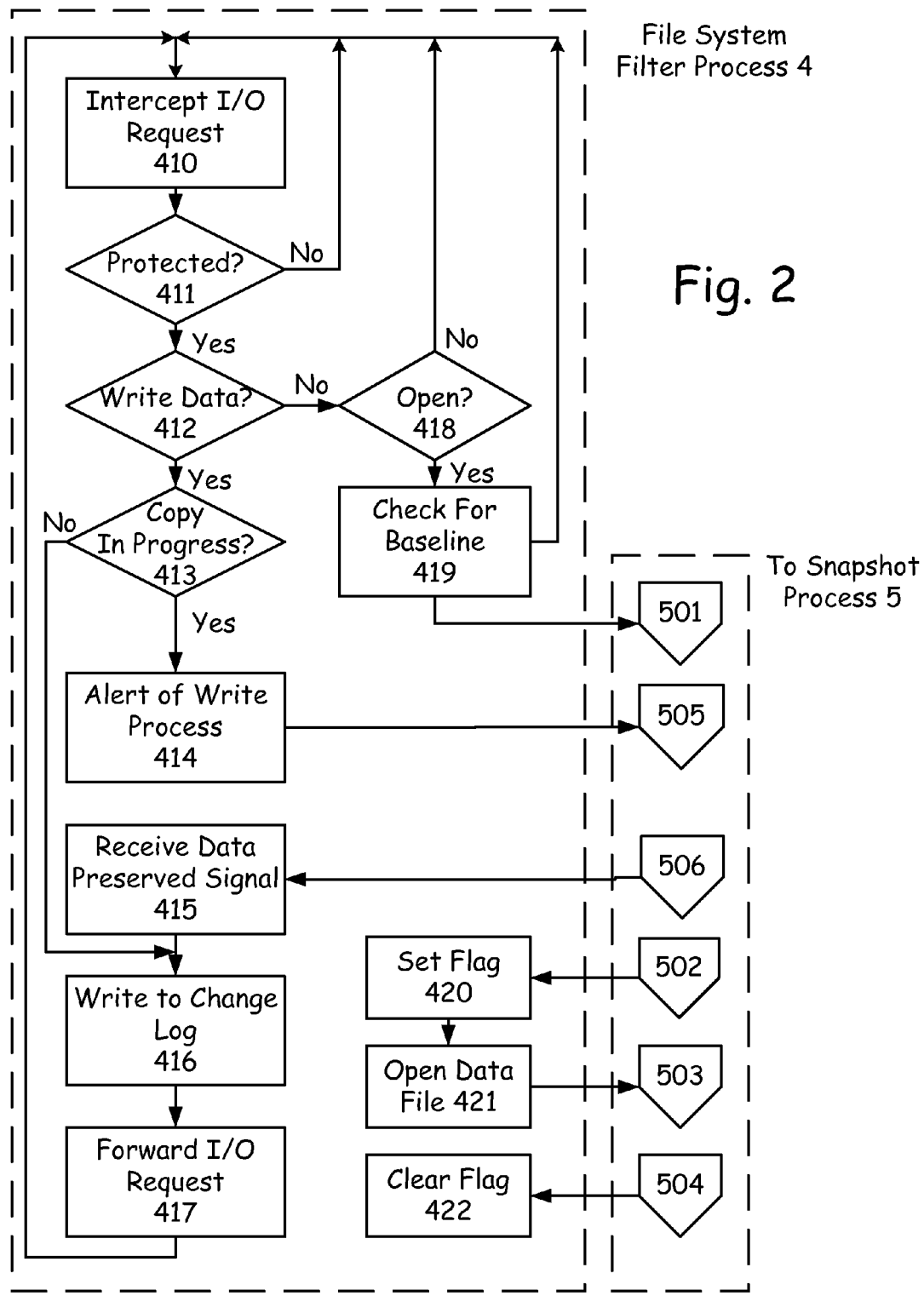
FIG. 2 is a flowchart of processing performed by the file system filter process according to an embodiment of the present invention.

FIG. 2 illustrates the detailed operational flow of the file system filter process 4 for one embodiment of the present invention.

The file system filter process 4 is interposed between the computer application 1 and the file system 2, and intercepts a subset of the I/O commands in block 410. If the I/O command is a request to open a protected data file 3, as determined in decision blocks 411 and 418, the snapshot process 5 is signaled to create a baseline copy 7 as required, via block 419 and connector 501 to FIG. 3. If the snapshot process 5 determines that a baseline copy 7 is required (described in more detail in regard to FIG. 3), it requests permission from the file system filter process 4 to start a baseline copy process via connector 502. The file system filter 4 sets a flag, as in block 420, to indicate that a snapshot or baseline copy process is in progress. It then opens the data file 3 in block 421, bypassing any exclusive access locks, and returns a "handle" to the open file 3 to the snapshot process 5 via connector 503. The file system filter process 4 in this embodiment does not need to distinguish between a baseline copy 7 and a periodic snapshot copy 8.

When the file system filter process 4 intercepts a write I/O command for a protected data file 3 via block 410 and decision blocks 411 and 412, it checks in decision block 413 whether a snapshot 8 (or baseline 7) of that file 3 is in progress. If a copy process of the protected data file 3 is in progress, it alerts the snapshot process 5 via block 414 and connector 505 that a write I/O operation on the protected data file 3 has been requested, and suspends the write I/O operation until it receives a signal from the snapshot process 5 via connector 506 to block 415 that the data to be overwritten has been preserved. The file system filter process 4 then records the range of data to be written in the change log 6, as given in block 416, and forwards the write I/O request to the file system 2, as given in block 417. If the system filter process 4 intercepts a write I/O command for a protected data file 3, but no copy process of that file is in progress as determined by decision block 413, the system filter process 4 records the range of data to be written in the change log 6, as given in block 416, and immediately forwards the write I/O request to the file system 2, as given in block 417.

After the snapshot process 5 has finished creating a snapshot, it notifies the file system filter process 4 via connector 504, and the "snapshot in progress" flag is cleared in block 422.

The file system filter process 4 operation described above is not intended to be exhaustive. Other embodiments may reorder, combine, or divide some of the operations described. These additional embodiments are equivalent to the one described above.

Snapshot Process

Figure 3:
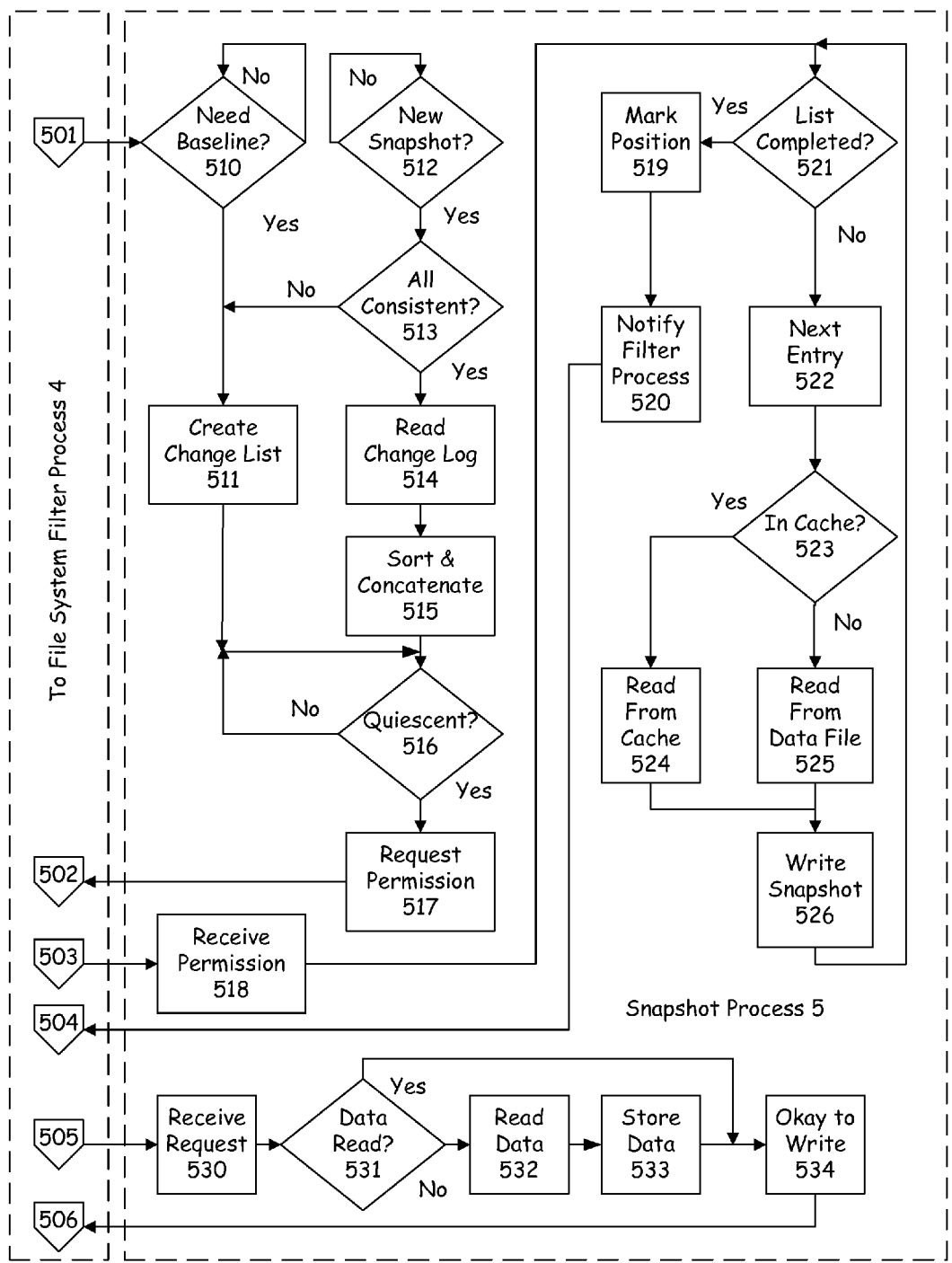
FIG. 3 is a flowchart of processing performed by the snapshot process according to an embodiment of the present invention.

FIG. 3 illustrates the detailed operational flow of the snapshot process 5 for one embodiment of the present invention.

The snapshot process 5 of the depicted embodiment can be initiated in one of two ways. First, it can be signaled by the file system filter process 4 to create a baseline copy 7 of the protected data file 3 via connector 501. The snapshot process 5 determines whether a baseline copy 7 is required in decision block 510. If no baseline copy 7 is required because, for example, one already exists, no further processing is needed. If a baseline copy 7 is required, the snapshot process 5 creates a change list that covers the entire protected data file 3 in block 511.

Second, the snapshot process 5 can be initiated on a time schedule to periodically create a snapshot copy 8 of the protected data file 3 in decision block 512. The snapshot process 5 checks that all existing snapshot copies of the protected data file 3 are consistent in decision block 513. If they are not, a new baseline copy 7 is created by branching to block 511. It the existing snapshot copes 8 are consistent, the snapshot process 5 reads the change log 6 into an internal change list in block 514. It sorts the change list by position within the protected data file 3, and concatenates the list by removing any duplicate or overlapping entries in block 515.

Regardless of how it is initiated, the snapshot process 5 waits until the protected data file 3 is quiescent for a specified period of time, as give in decision block 516. The protected data file 3 is considered to be quiescent when there have been no write operations to it for the quiescent time period. This ensures that the protected data file 3 is internally consistent. Once the protected data file 3 becomes quiescent, the snapshot process 5 requests permission from the file system filter process 4 via block 517 and connector 502, to start a snapshot copy. The snapshot process 5 receives permission to start the backup via connector 503 and block 518. This includes a "handle" to the data file 3 that the snapshot process 5 can use to by-pass the exclusive access lock and read data from data file 3.

The snapshot process 5 begins processing the change list by getting the first entry with decision block 521 and block 522. Each change list entry contains the range of data in the data file 3 that was changed. For example, the range might be identified by the starting byte offset and the ending byte offset of the data that was changed. The snapshot process 5 checks to see if any data within this range is contained in its internal preserved data cache in decision block 523. The preserved data cache contains the data from all write operations performed on the data file 3 during the snapshot process, and is described in more detail below.

If the data from the range specified in the list entry is contained in the internal preserved data cache, the data within that range is assumed to have already been overwritten in the data file 3, so the data is read from the preserved data cache in block 524. If the data from that range is not contained in the internal preserved data cache, the data within that range has not been changed in the data file 3, so the data is read from the data file 3 in block 525. Both the range information and the data within this range are written into either the baseline file 7 or the snapshot file 8, as given in block 526.

Processing of the change list occurs one entry at a time until the change list has been exhausted in decision block 521. At that point the snapshot file 8 is complete. The position in the change log 6 is marked in block 519. Because the change log 6 is chronological, the marker is placed at the time corresponding to when the most recent snapshot process began. The next snapshot process will begin at the position of this marker. The snapshot process 5 signals the file system filter process 4 via block 520 and connector 504 that it has finished the snapshot 8.

Because creating a snapshot file usually requires several reads and writes to occur over a period of time, the computer application 1 may perform write operations to the data file 3 during the time the snapshot file 8 is being created. In order for the snapshot file 8 to be consistent with the contents of the data file 3 as it existed at the beginning of the snapshot process, the snapshot process 5 must be informed by the file system filter process 4 when a write operation is requested by the application, so that the data to be overwritten can be read before it is modified.

The snapshot process 5 is signaled that the computer application 1 is requesting to perform a write I/O operation on the data file 3 by the file system filter process 4 via connector 505 and block 530. The snapshot process 5 checks to see if it already has processed the data that will be modified in decision block 531. If that data range within the data file 3 has already been processed, the write will not affect the data already written to the snapshot file 8, and the snapshot process 5 immediately signals the file system filter process 4 to allow the write I/O operation to complete, as given in block 534 and connector 506 to FIG. 2.

However, if that data range within the data file 3 has not been processed already, then the snapshot process 5 reads the unchanged data within the range to be modified from the data file 3, as given in block 532. This data is then stored in an internal preserved data cache with the range information, as given in block 533. The snapshot process 5 then signals the file system filter process 4 to allow the write I/O operation to complete, as given in block 534 and connector 506.

The embodiment of the snapshot process operation described above is not intended to be exhaustive. Other embodiments may reorder, combine, or divide some of the operations described. These additional embodiments are equivalent to the one described above.

Restoration

The baseline file 7 contains the complete contents of the data file 3 at a particular point in time t0, as depicted in FIG. 1. Each snapshot file 8 that is created subsequent to the baseline file 7 contains only the changes that have occurred since the immediately preceding snapshot. That is, snapshot file 8a contains only the changes that occurred in the data file 3 between t0 and t1; snapshot file 8b contains only the changes that occurred in the data file 3 between t1 and t2; and so forth. Restoring the full contents of the data file 3 at any point in time requires the merging of zero or more snapshot files 8 into the baseline file 7. For example, restoring the contents of data file 3 at time t2 requires merging snapshot file 8a into baseline file 7, and then merging snapshot 8b into the intermediate merged file. Note that the data file 3 can only be exactly restored to a point in time that corresponds to one of the snapshot files.

In other embodiments, a master snapshot file 8 is created that includes all of the changes from the time that the baseline file was created at time t0 until the snapshot file 8 was created at the desired time tx. Although less time is required for the restore operation by using these master files, they require more space to store because they include all of the changes up until that time tx. In yet another embodiment, the master files include the baseline information as well, so that they are self-contained versions of the data file 3 as it existed at time tx. However, an even greater amount of storage space is required for these master files.

Some of the embodiments of the present invention use several parameters that are supplied to the process modules. These parameters include, but are not limited to (1) the preselected data file or files, (2) the length of the quiescent time period, and (3) the desired time between periodic snapshots. An administrator or user can enter or select parameter values appropriate to their specific needs.

The foregoing description of preferred embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for backing up a computer-readable data file with a computerized backup application, where the data file is open and locked for exclusive access by an owning application that is mutually independent of the backup application, the method comprising the sequential steps of:
   by-passing the lock on the data file,
   intercepting and delaying any write operations to the data file by the owning application,
   writing to a change log file an address range of any write operations directed to the data file by the owning application during the backup procedure, where the change log file contains no indication of a content of the write operations,
   copying at least a portion of the data file to a backup file, and
   passing any intercepted and delayed write operations on to the data file after the data to be overwritten has been copied to the backup file.

2. The method of claim 1, wherein the backup application creates a baseline copy of the data file by
   copying all contents of the data file to the backup file.

3. The method of claim 1, wherein the backup application creates a snapshot copy of the data file by
   determining that the data file is quiescent, and
   copying to the backup file only those contents of the data file that have changed since a prior backup copy of the data file was created.

4. The method of claim 3, wherein a quiescent time is specified by a user.

5. The method of claim 3, wherein an automatic snapshot copy creation interval is specified by a user.

6. The method of claim 1, wherein the data file to backup is user-selectable.

7. The method of claim 1, wherein the data file is too large to copy in a single read operation.

8. A method for backing up a computer-readable data file with a computerized backup application, where the data file is open and locked for exclusive access by an owning application that is mutually independent of the backup application, the method comprising the steps of:
   creating a baseline copy of the data file by,
     by-passing the lock on the data file,
     intercepting and delaying any write operations to the data file by the owning application,
     writing to a change log file an address range of any write operations directed to the data file by the owning application during the baseline copy creation procedure, where the change log file contains no indication of a content of the write operations,
     copying all contents of the data file to the baseline copy, and
     passing any intercepted and delayed write operations on to the data file after the data to be overwritten has been copied to the baseline copy, and
   creating a snapshot copy of the data file by,
     determining that the data file is quiescent,
     by-passing the lock on the data file,
     intercepting and delaying any write operations to the data file by the owning application,
     writing to a change log file an address range of any write operations directed to the data file by the owning application during the snapshot copy creation procedure, where the change log file contains no indication of the content of the write operations,
     copying at least a portion of the contents of the data file to the snapshot copy, and
     passing any intercepted and delayed write operations on to the data file after the data to be overwritten has been copied to the snapshot copy.

9. The method of claim 8, wherein the intercepting, delaying, and writing steps are performed by a file system filter process that resides at a kernel level.

10. The method of claim 8, wherein the copying steps are performed by a snapshot process that resides at a user level.

11. The method of claim 8, wherein a quiescent time is specified by a user.

12. The method of claim 8, wherein an automatic snapshot copy creation interval is specified by a user.

13. The method of claim 8, wherein the data file to backup is user-selectable.

14. The method of claim 8, wherein the data file is too large to copy in a single read operation.

15. A computer readable medium containing program elements operable to instruct a computer system to backup a computer-readable data file with a computerized backup application, where the data file is open and locked for exclusive access by an owning application that is mutually independent of the backup application, the program elements comprising instructions for:
   by-passing the lock on the data file,
   intercepting and delaying any write operations to the data file by the owning application,
   writing to a change log file an address range of any write operations directed to the data file by the owning application during the backup procedure, where the change log file contains no indication of a content of the write operations,
   copying at least a portion of the data file to a backup file, and
   passing any intercepted and delayed write operations on to the data file after the data to be overwritten has been copied to the backup file.

16. The computer readable medium of claim 15, wherein the program elements create a baseline copy of the data file by
   copying all contents of the data file to the backup file.

17. The computer readable medium of claim 15, wherein the program elements create a snapshot copy of the data file by
   determining that the data file is quiescent, and
   copying to the backup file only those contents of the data file that have changed since a prior backup copy of the data file was created.

18. The computer readable medium of claim 17, wherein a quiescent time is specified by a user.

19. The computer readable medium of claim 17, wherein an automatic snapshot copy creation interval is specified by a user.

20. The method of claim 15, wherein the data file to backup is user-selectable.

* * * * *